L. C. OWENS.
COUPLING DEVICE FOR VEHICLES.
APPLICATION FILED DEC. 21, 1918.
1,295,193.
Patented Feb. 25, 1919.
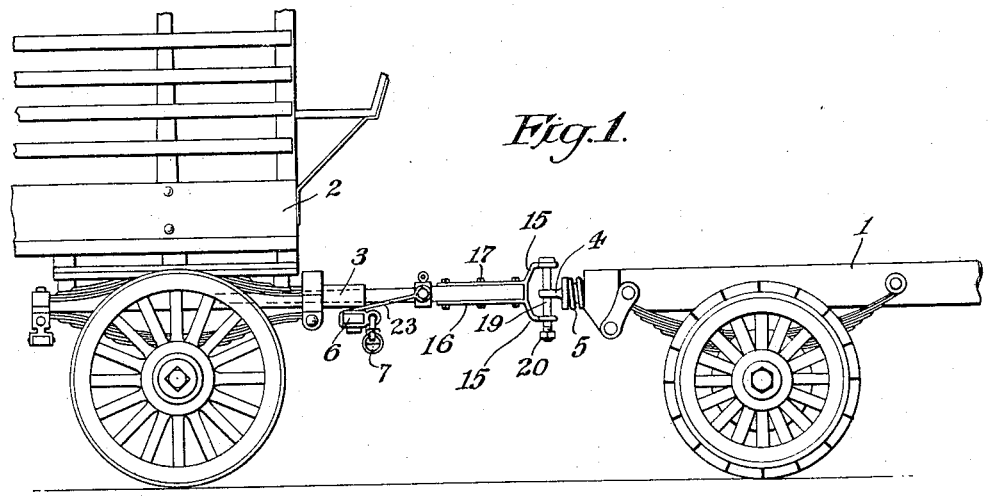
Fig. 1.
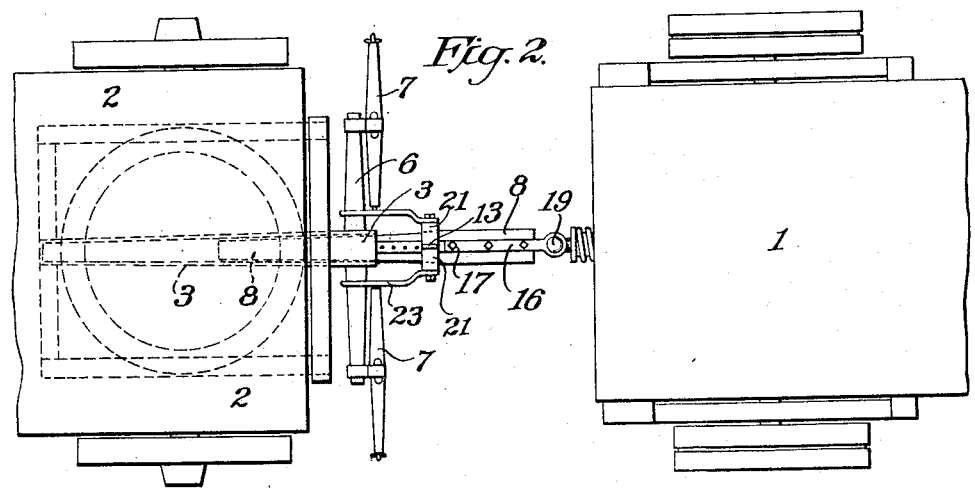
Fig. 2.
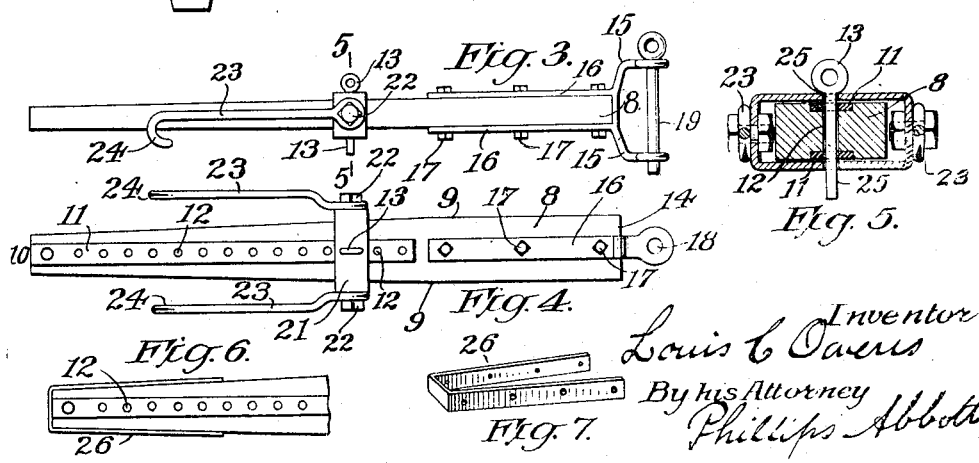
Fig. 3.
Fig. 4.
Fig. 5.
Fig. 6.
Fig. 7.
Louis C Owens, Inventor
By his Attorney
Phillips Abbott.

UNITED STATES PATENT OFFICE.

LOUIS C. OWENS, OF NEW YORK, N. Y.

COUPLING DEVICE FOR VEHICLES.

1,295,193.  Specification of Letters Patent.  Patented Feb. 25, 1919.

Application filed December 21, 1918. Serial No. 267,740.

*To all whom it may concern:*

Be it known that I, LOUIS C. OWENS, a citizen of the United States, and a resident of the borough of Manhattan, city, county, and State of New York, have invented certain new and useful Improvements in Coupling Devices for Vehicles, of which the following is a specification, reference being had to the accompanying drawings.

It is the purpose of this invention to provide means whereby a tractor, or other draft means, and a trailer, such as a dray, truck, or wagon, may be coupled together, irrespective of the size, construction and height of either and of the size and construction of the pole socket.

Many concerns, both manufacturing and commercial, which deliver their merchandise in quantity, and have therefore equipped themselves with drays, trucks and the like of varying capacity and differing construction, find it desirable in these days when speed and high efficiency are necessary, to couple the dray, truck or wagon to a tractor or other draft means in order that the time required for deliveries may be reduced, but in doing so experience the difficulty of having to provide each trailer with its own coupling devices, owing to the differences in their height, size and construction. It is therefore the purpose of this invention, as stated above, to provide a short pole or coupler adapted to use with wagons, drays, trucks and the like of all sizes, heights and construction, thus materially reducing expense and adding to convenience.

Referring to the drawings, Figure 1 is an elevation showing a portion of the rear of a suitable tractor and a portion of the front of a trailer connected by my improved coupler; Fig. 2 is a plan view of that which is shown in Fig. 1; Fig. 3 is an elevation of the body part and associated features of the coupler; Fig. 4 is a plan view of that which is shown in Fig. 3; Fig. 5 is a view, partly in vertical section, taken on the line 5—5 of Fig. 3; Fig. 6 is a plan view showing a detail of the adapter plate; Fig. 7 is a perspective view of the adapter plate detached from the other parts.

In the drawings 1 represents the tractor, or equivalent draft means, 2 the trailer, 3 the usual pole socket built into the running gear of the trailer, 4 the eye or link on the end of the draw bar of the tractor, 5 the usual spring which cushions the tractor draw bar, 6, the usual evener for the trailer, 7 the usual whiffle trees. The evener 6 is of course suitably pivoted to the socket 3.

Referring now to Figs. 3, 4, and 5, which illustrate the details of my invention, 8 represents the body part of the coupler. It is preferably, but not necessarily, of wood. It may be tapered throughout its entire length, but I prefer that the taper should start from a given point, as for instance, the point 9, and extend to the rearward end 10. The body part 8 is reinforced by suitably attaching thereto on its top and bottom heavy strap iron 11. Through the body part 8 and the reinforcing strap irons 11 are a series of registering holes 12 through which a pin 13 is adapted to pass. Upon the top and bottom of the forward end 14, see Fig. 4, of the body part 8 is attached a substantial yoke, comprising two separated terminals 15 and two rearwardly extending straps 16, which are held to the body part by bolts 17. Each of the terminals 15 is provided with an eye 18, see Fig. 4, through which a bolt 19, see Figs. 1 and 2, passes. If desired a nut 20 may be used upon the end of the bolt. 21 is a substantial sleeve which is adapted to slide freely longitudinally of the body part 8 and pivoted to it at each end by strong bolts 22 are two bars 23, each having a hook 24, see Fig. 3, on its end. The upper and lower webs of the sleeve 21 are perforated, as at 25, see Fig. 5, so that the pin 13 may pass therethrough.

The operation of the apparatus as thus far described is as follows:

The ordinary long pole of the vehicle for horse use is removed and the rearwardly tapered end 10 of the body part of the coupler is then introduced into the pole socket and pushed therethrough until it fits snugly therein. The pivoted bars 23 are then so manipulated that the hooks 24 upon their ends respectively shall engage over the evener 6 and the sleeve 21 is moved forwardly over the body part of the tractor 8 until the holes in the sleeve register with the proper hole 12 in the body part 8. Thereupon the pin 13 is passed through the holes in the sleeve and in the strap iron 11 and body part 8, thus securely locking the coupler to the trailer through the instrumentality of the sleeve 21, hooked bars 23 and evener 6.

To connect the coupler to the tractor, the pin 19 is drawn out from the eyes in the terminals 15 and the eye 4 on the end of the draw bar of the tractor is moved into position and the pin 19 passed through it and the eyes of the terminals. The nut 20, if used, is then screwed into place.

It will be noted that because of the peculiar construction and assemblages of the devices composing my invention I secure the following series of important and valuable advantages:

First. The tapering form of the rear end of the coupler body part 8 co-acting with the longitudinally sliding sleeve 21, having its pivoted, hence movable hooked bars 23, enables the draft means to be firmly and reliably connected to any trailer (wagon, truck, or dray) irrespective of the size of the pole socket built into the running gear thereof.

Second. The connection may be speedily made without the employment of any tools or skill on the part of the operator.

Third. The devices at the forward end of the coupler compensate for the differences in height between the pole socket of the trailer and the draw bar of the tractor because the eye 14 will automatically assume its proper position upon the bolt 19. If the draw bar be higher than the socket then the eye will engage with the upper part of the pin 19, if they are of substantially the same height, the eye will engage with the central part of the pin, and if the tractor draw bar is lower than the socket, the eye will engage with the lower part of the pin 19.

Fourth. Because of the adjustability of the relation between the drawbar of the tractor and the socket there results the extremely important advantage that in the event of unevennesses in the roadbed, as for instance, raised crosswalks, holes, repair planking and the like, no strain will be brought upon any of the devices, for the eye 4 will slide upwardly and downwardly along the pin 19 as occasion may require.

It will be noted that in the adjustment of the tapered rear end of the coupler body part in the pole socket of the trailer and of the sliding sleeve 21 with its hooked straps 23, the relation between the several parts may be such that the tapered rear end can not retain snug engagement with the socket when the strain of the draft is applied, owing to the space necessarily separating the holes 12. The lost motion thus occasioned is entirely unimportant, however. The guidance and control of the trailer by the draft means is what is desired and that is adequately attained by my invention.

In Figs. 6 and 7 I show what I call the adapter plate whereby my coupler is adapted to use with unusually large trailers, such as three or four horse drays, in which the width of the pole socket is usually somewhat extreme. The adapter consists of a relatively thick metallic band 26 preferably of strap iron, bent into the form shown, which may be applied and held in any preferred manner upon the tapered rear end 10 of the body part 8, thus enlarging its transverse dimensions and adapting the coupler to suitable engagement with large pole sockets.

It will be obvious to those who are familiar with such matters that modifications may be made in the details of construction of the parts above described and illustrated without departing from the essentials of the invention, since they show one form only in which the invention, which I call a universal coupler, may be embodied. I therefore do not limit myself thereto. Furthermore, although I have described the invention as employed in connection with a tractor or draft engine, obviously it is adapted to use when any other draft means are employed, such as horses, or otherwise. In the claims hereof when I use the term "tractor" I include all draft means.

I claim:

1. A coupler comprising a rearwardly tapered body part having a series of holes therethrough, a sleeve adapted to slide longitudinally along the body part and having holes which may register with those in the body part, hooked bars attached to the sleeve and means at the forward end of the body part whereby it may be coupled to a suitable tractor.

2. A coupler comprising a rearwardly tapered body part having perforated metallic reinforcing straps upon its top and bottom, a series of registering holes through the straps and through the body part, a sleeve adapted to slide longitudinally over the body part and having holes which may register with those in the reinforcing straps and body part, hooked parts pivoted to the sleeve and means at the forward end of the body part whereby it may be coupled to a suitable tractor.

3. A coupler comprising a rearwardly tapered body part having a series of holes therethrough, a draft yoke at the forward end of the body part having separated and perforated terminals, a draft pin extending through both terminals of the yoke, a sleeve adapted to slide longitudinally over the body part having holes which may register with those in the body part, hooked bars attached to the sleeve, and a pin adapted to pass through the holes in the sleeve and in the body part.

4. A coupler comprising a rearwardly tapered body part having a series of holes therethrough, reinforcing metal on the top and bottom of the body part having perforations which register with the holes therein, a draft yoke at the forward end of the body part having separated and perforated terminals, a draft pin extending through both terminals of the yoke, a sleeve adapted to slide longitudinally over the body part and having holes which may register with those in the body part, hooked bars attached to the sleeve and a pin adapted to pass through the holes in the sleeve and in the body part.

5. In combination with a coupler bar having means at one end for connection with a tractor, a sleeve adapted to be adjusted longitudinally upon the coupler bar and to be adjustably attached thereto, and hooked rods adapted to engage with the evener of a trailer attached to opposite sides of the sleeve.

6. In combination with a rearwardly tapered and perforated coupler bar, a device at its forward end for connection with a tractor comprising a yoke having separated and perforated terminals and a pin adapted to pass through the perforations in both terminals.

7. In combination with a coupler bar having means at one end for connection with a tractor, a sleeve adapted to be adjusted longitudinally upon the coupler bar and to be adjustably attached thereto, hooked rods adapted to engage with the evener of a trailer attached to opposite sides of the sleeve and adapter plates for the sides of the tapered end of the coupler bar.

In testimony whereof I have signed my name to this specification.

LOUIS C. OWENS.

Copies of this patent may be obtained for five cents each, by addressing the "Commissioner of Patents, Washington, D. C."